(12) United States Patent
Coretto et al.

(10) Patent No.: US 9,964,223 B2
(45) Date of Patent: May 8, 2018

(54) BLEED VALVES FOR GAS TURBINE ENGINES

(71) Applicant: Hamilton Sundstrand Corporation, Charlotte, NC (US)

(72) Inventors: August M. Coretto, Manchester, CT (US); Francis P. Marocchini, Somers, CT (US); Aaron F. Rickis, Feeding Hills, MA (US); Robert Goodman, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days. days.

(21) Appl. No.: 14/798,166

(22) Filed: Jul. 13, 2015

(65) Prior Publication Data

US 2017/0016549 A1 Jan. 19, 2017

(51) Int. Cl.
| | |
|---|---|
| *F16K 3/06* | (2006.01) |
| *F16K 21/14* | (2006.01) |
| *F01D 17/10* | (2006.01) |
| *F04D 27/02* | (2006.01) |
| *F02C 6/08* | (2006.01) |
| *F16K 17/20* | (2006.01) |
| *F16K 3/04* | (2006.01) |
| *F16K 31/12* | (2006.01) |

(52) U.S. Cl.
CPC ............ *F16K 21/14* (2013.01); *F01D 17/105* (2013.01); *F02C 6/08* (2013.01); *F04D 27/0215* (2013.01); *F16K 3/04* (2013.01); *F16K 17/20* (2013.01); *F16K 31/12* (2013.01)

(58) Field of Classification Search
CPC . F16K 21/14; F16K 3/04; F16K 31/12; F16K 17/20; F01D 17/105; F02C 6/08; F04D 27/0215

USPC .... 137/521, 517, 520, 527, 527.2, 855, 856; 251/177, 304, 305
See application file for complete search history.

(56) References Cited

U.S. PATENT DOCUMENTS

| 323,539 | A | * | 8/1885 | Smith | ..................... F16K 15/03 |
| | | | | | 137/520 |
| 365,945 | A | * | 7/1887 | Smith | ..................... F16K 15/03 |
| | | | | | 137/520 |
| 735,912 | A | * | 8/1903 | Schrotz | ................... F02D 17/04 |
| | | | | | 123/198 D |

(Continued)

FOREIGN PATENT DOCUMENTS

JP 2003148167 A 5/2003

OTHER PUBLICATIONS

European Search Report received from European Patent Office dated Dec. 8, 2016 for European Application No. EP16179255.

*Primary Examiner* — Minh Le
(74) *Attorney, Agent, or Firm* — Locke Lord LLP; Scott D. Wofsy; Christopher J. Cillié

(57) ABSTRACT

A bleed valve for a gas turbine engine compressor has a valve body and a flapper. The valve body defines a flow path and includes a flapper seat. The flow path extends through the valve body. The flapper is pivotally connected to the valve body and is movable between a closed position and an open position. In the closed position the flapper seats against the flapper seat and blocks the flow path. In the open position the flapper is angled towards the valve body inlet such that fluid moving through the valve body exerts force on the flapper, urging the flapper towards the closed position.

11 Claims, 4 Drawing Sheets

(56) References Cited

U.S. PATENT DOCUMENTS

| | | | | |
|---|---|---|---|---|
| 810,746 A * | 1/1906 | Moylan | ............... | F16K 41/12 |
| | | | | 137/513.3 |
| 1,447,102 A * | 2/1923 | Rae | ............... | F16T 1/12 |
| | | | | 137/103 |
| 2,704,648 A | 3/1955 | Cobb | | |
| 3,380,474 A * | 4/1968 | Mills | ............... | F16K 15/144 |
| | | | | 137/517 |
| 3,386,467 A | 6/1968 | Katchka | | |
| 3,612,098 A * | 10/1971 | Bora | ............... | F16K 15/033 |
| | | | | 137/527 |
| 3,831,429 A * | 8/1974 | Kmiecik | ............... | G01F 25/0061 |
| | | | | 137/460 |
| 3,996,961 A | 12/1976 | Siegwart | | |
| 4,009,366 A * | 2/1977 | Danell | ............... | F02N 19/10 |
| | | | | 137/856 |
| 4,117,860 A * | 10/1978 | Carlin | ............... | A62C 33/00 |
| | | | | 137/513.5 |
| 4,196,745 A * | 4/1980 | Schutzer | ............... | F16K 1/223 |
| | | | | 137/512.1 |
| 4,266,569 A * | 5/1981 | Wilson | ............... | F16K 15/03 |
| | | | | 137/527.2 |
| 5,004,010 A * | 4/1991 | Huet | ............... | F16K 17/28 |
| | | | | 137/513.3 |
| 6,050,294 A * | 4/2000 | Makowan | ............... | E03B 7/077 |
| | | | | 137/527 |
| 6,397,874 B1 * | 6/2002 | Featheringill | ............... | E03F 1/006 |
| | | | | 137/112 |
| 6,648,012 B2 * | 11/2003 | Linthorst | ............... | F16K 15/026 |
| | | | | 137/522 |
| 6,851,255 B2 | 2/2005 | Aitchison et al. | | |
| 7,114,519 B2 | 10/2006 | Aitchison et al. | | |
| 7,533,693 B2 * | 5/2009 | Colton, Jr. | ............... | F16K 15/031 |
| | | | | 116/277 |
| 7,555,905 B2 * | 7/2009 | Borcea | ............... | F02C 6/08 |
| | | | | 215/279 |
| 7,568,498 B2 | 8/2009 | Denike et al. | | |
| 7,779,859 B2 | 8/2010 | Denike et al. | | |
| 7,828,011 B2 * | 11/2010 | Huet | ............... | F16K 15/033 |
| | | | | 137/521 |
| 8,015,825 B2 | 9/2011 | Elder et al. | | |
| 8,733,381 B2 * | 5/2014 | Peyton | ............... | E03B 9/16 |
| | | | | 137/15.02 |
| 8,814,498 B2 * | 8/2014 | Goodman | ............... | F01D 17/105 |
| | | | | 415/118 |
| 8,955,542 B2 * | 2/2015 | Kiezulas | ............... | B60H 1/249 |
| | | | | 137/512 |
| 2012/0031105 A1 | 2/2012 | Thiyagarajan et al. | | |
| 2014/0109589 A1 | 4/2014 | Pritchard, Jr. et al. | | |
| 2016/0130972 A1 * | 5/2016 | Kozuch | ............... | F02C 6/08 |
| | | | | 415/145 |

* cited by examiner

BLEED VALVES FOR GAS TURBINE ENGINES

BACKGROUND OF THE INVENTION

1. Field of the Invention

The present disclosure relates to gas turbine engines, and more particularly to valves for bleeding compressed fluid from gas turbine engines.

2. Description of Related Art

Gas turbine engines commonly include functional sections such as a compressor section, a combustor section, and a turbine section. During steady state operation the compressor section ingests air from the ambient environment and compresses the fluid using rotational energy provided by the turbine section. The compressor section communicates the compressed air to the combustor section where a mixture of fuel and compressed air is ignited, producing high pressure combustion products which the combustor section then communicates to the turbine section. The turbine section expands the high pressure combustion products, extracting work that is applied as mechanical rotation to the compressor section. Under certain conditions, such as during engine start-up, it can be advantageous to reduce the amount of rotational energy required by the compressor section by reducing the compression that air undergoes in the compressor section. Some gas turbine engines include bleed valves operable to allow compressed air to bypass a portion of the engine, reducing the amount of rotational energy required by the compressor section. Such valves may include a poppet assembly for opening and closing the valve.

Such conventional bleed valves have generally been considered satisfactory for their intended purpose. However, there is still a need in the art for improved bleed valves and methods of operating bleed valves. The present disclosure provides a solution for this need.

SUMMARY OF THE INVENTION

A bleed valve for a gas turbine engine compressor has a valve body and a flapper. The valve body defines a flow path and includes a flapper seat. The flow path extends through the valve body. The flapper is pivotally connected to the valve body and is movable between a closed position and an open position. In the closed position the flapper seats against the flapper seat and blocks the flow path. In the open position the flapper is angled towards the valve body inlet such that fluid moving through the valve body exerts force on the flapper, urging the flapper towards the closed position.

In certain embodiments, the valve body can define a flapper stop that is disposed on an interior of the valve body along the flow path. The flapper can have opposed high pressure and low pressure surfaces. The high pressure surface can face the inlet in both the open and closed positions, and can abut the stop when the flapper is in the open position. The low pressure surface can face the outlet in both the open and closed positions, and can abut the flapper seat in the closed position. The flapper seat can extend about the flow path at an angle. The angle can be an oblique angle such that flapper seat defines an oblong or ellipsoid surface facing the inlet and extending about the flow path.

In accordance with certain embodiments, the flapper seat can be angled in a range of between about 40 degrees to about 50 degrees relative to a flow axis defined by the flow path. The angle can be about 45 degrees. The flapper open and closed positions can be separated by movement angle of between about 27.5 degrees and 37.5 degrees. The movement angle can be about 32.5 degrees from the full open to the full closed position. In the open position, and end of the flapper opposite a flapper pivot axis can extend beyond the stop and into the flow path.

It is also contemplated that, in accordance with certain embodiments, the valve body can be a two-part valve body having an inlet end and an outlet end. The inlet end can connect to the outlet end at a location adjacent to the flapper seat. The flapper can connect to the outlet end of the valve body at a pivot pin. The pivot pin can define a pivot axis that is in-line with the flapper seat and angled (e.g. orthogonal) relative to the flow path. A biasing member, such as a spring, can be coupled between the flapper and the outlet end of the valve body, and can exert a biasing force that urges the flapper toward the open position. Pillow blocks can couple the pivot pin to the outlet end, and the pillow blocks can be disposed externally of flow path defined by the valve body interior.

In an aspect, a gas turbine engine includes a compressor section with a bleed valve as described above. The compressor section defines a main flow path and has a bleed port in fluid communication with the main flow path. The bleed valve connects to the compressor section bleed port such that the bleed valve connects the main flow path with the environment external to the compressor section when the flapper is in the open position, and fluidly isolates the main flow path from the external environment when the flapper is in the closed position.

In embodiments, an outlet of the bleed valve can be in fluid communication with the ambient environment outside of the gas turbine. An outlet of the bleed valve can be in fluid communication with a compressor stage disposed downstream of the bleed valve such that one or more intervening compressor stages are bypassed when the bleed valve flapper is the open position. The bleed valve can connect to the compressor section directly, without an intervening turning duct upstream and/or downstream of the bleed valve. In embodiments the biasing member can have a predetermined bias force that urges the flapper toward the open position and which is matched to a flapper closure pressure differential.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
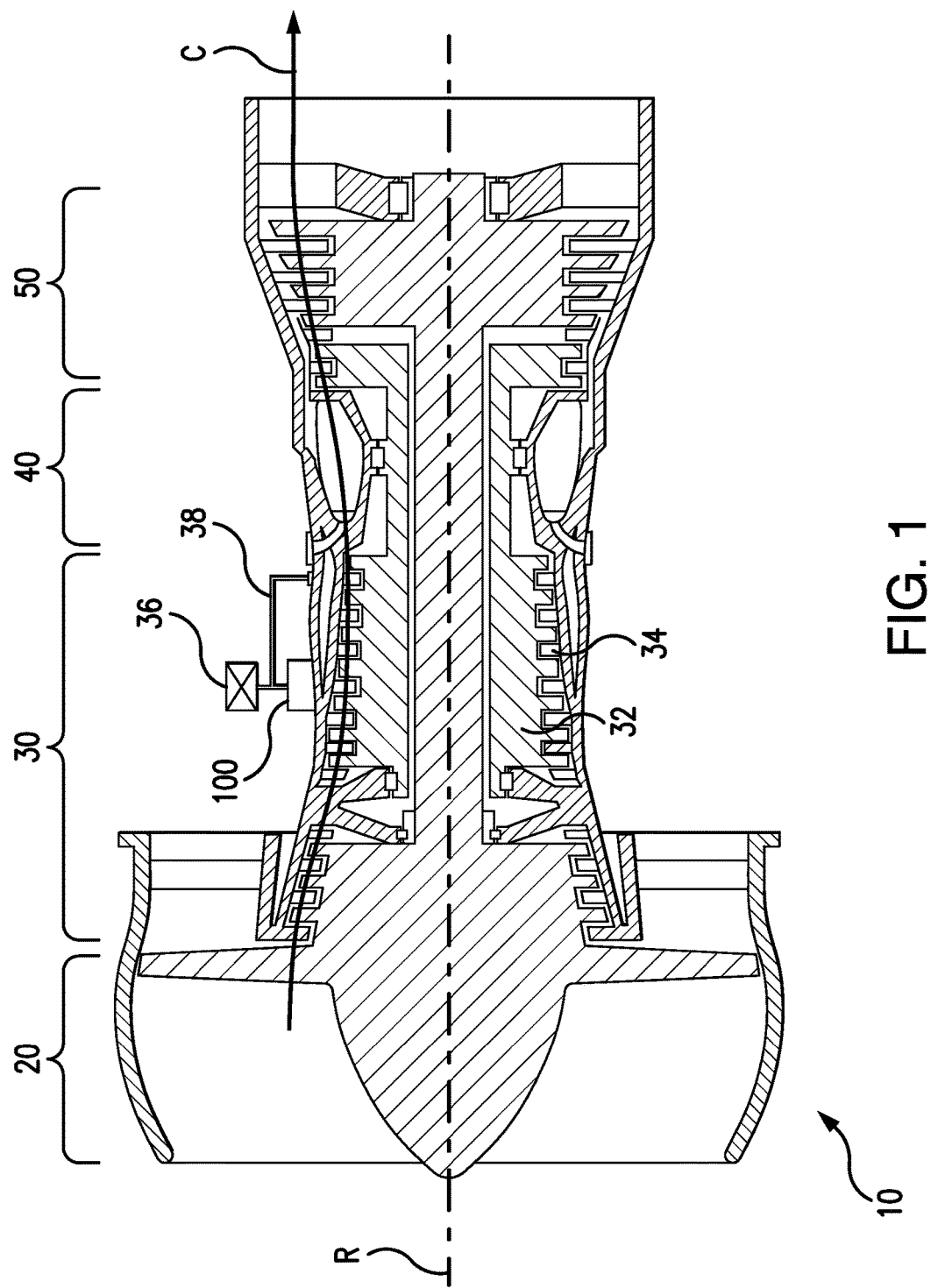
FIG. 1 is a schematic view of an exemplary embodiment of a gas turbine engine constructed in accordance with the present disclosure, showing a bleed valve connected to a compressor section of a gas turbine engine.

Reference will now be made to the drawings wherein like reference numerals identify similar structural features or aspects of the subject disclosure. For purposes of explanation and illustration, and not limitation, a partial view of an exemplary embodiment of bleed valve in accordance with the disclosure is shown in FIG. 1 and is designated generally by reference character 100. Other embodiments of bleed valves in accordance with the disclosure, or aspects thereof, are provided in FIGS. 2-5, as will be described. The bleed valves described herein can be used for bleeding air from gas turbine engine compressor sections, such as during start-up of aircraft auxiliary power units or main engines.

FIG. 1 shows a gas turbine engine 10. Gas turbine engine 10 includes main gas path C extending through a fan section 20, a compressor section 30, a combustor section 40, and a turbine section 50. Compressor section 30 is in fluid communication with combustor section 40, includes a compressor rotor 32 that is rotatably supported relative to a compressor stator 34, and is configured to compresses fluid using rotational energy provided by turbine section 50. Fuel is intermixed with the compressed fluid and ignited in combustor section 40 to generate high pressure combustion products. Combustor section 40 communicates the high pressure combustion products to turbine section 50, which expands and extracts the work therefrom. Turbine section 50 is operably associated with both fan section 20 and compressor section 30, and applies work extracted from the expanding combustion products to supply mechanical rotation to fan section 20 and compressor section 30.

Bleed valve 100 is connected to compressor section 30 to selectively placing main gas path C in fluid communication with a vent 36 and/or a bypass duct 38. Bleed valve 100 is self-actuated, and in the illustrated exemplary embodiment effect fluid communication by displacing a flapper 116 (shown in FIG. 2) from the flapper open position (shown in FIG. 4) and towards the flapper closed position (shown in FIG. 3) when differential pressure across the bleed valve increases above a predetermined level. Below the predetermined pressure differential flapper 116 displaces to the flapper open position, and fluid from compressor section 30 traverses bleed valve 100. Above the predetermined pressure differential flapper 116 assumes the closed position, and bleed valve 100 fluidly isolates main gas path C from the environment external to compressor section 30. As will be appreciated, this reduces the rotational energy necessary to rotate compressor rotor 32 and facilitates start-up of gas turbine engine 10.

Figure 2:
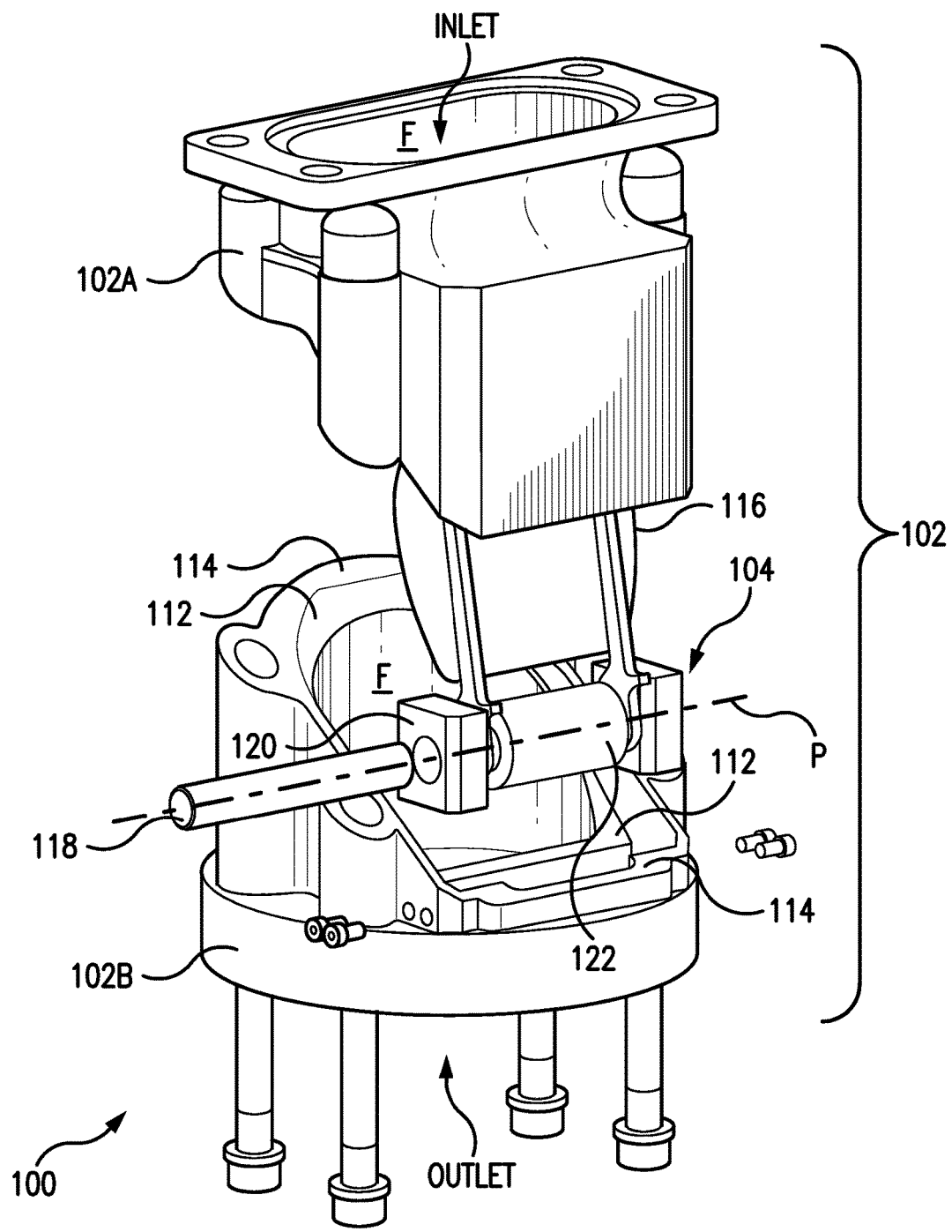
FIG. 2 is an exploded perspective view of the bleed valve of FIG. 1, showing the bleed valve body and flapper assembly.

With reference to FIG. 2, bleed valve 100 is shown. Bleed valve 100 includes a valve body 102 and a flapper assembly 104. Valve body 102 includes an inlet end 102A and an opposed outlet end 102B. Inlet end 102A defines a fluid inlet for receiving fluid from compressor section 30 (shown in FIG. 1) and an inlet portion of fluid path F. Outlet end 102B defines a fluid outlet, an outlet portion of fluid path F, a flapper seat 112, and flange 114 which extend about a flow path F defined with bleed valve 100. Flapper assembly 104 connects to outlet end 102B pivotally at a location offset from flow path F.

Inlet end 102A connects to outlet end 102B at a flange 114 with a plurality of fasteners. The fasteners, illustrated with four exemplary bolts, extend through outlet end 102B and apertures defined within inlet end 102A and seat in compressor section 30 (shown FIG. 1). While the fasteners are shown in the illustrated exemplary embodiment as bolts, it is to be understood and appreciated that any suitable types of fasteners may be used. Outlet end 102B defines flapper seat 112 which extends about flow path F and defines a planar seating surface for seating flapper 116 in the closed position (shown in FIG. 4).

With continuing reference to FIG. 2, flapper assembly 104 includes flapper 116, a pivot pin 118, pillow blocks 120, and a biasing member 122. Pillow blocks 120 include bearings and connect to outlet end 102B on inlet sides of flow path F. Flapper 116 and biasing member 122 seat about pivot pin 118. Pivot pin 118 rotatably seats within pillow blocks 120 and defines a pivot axis P that is disposed within a plane defined by flapper seat 112.

The split arrangement of the exemplary embodiment of housing 102 illustrated in FIG. 2 facilitates assembly of bleed valve 100. For example in an exemplary assembly method, inlet end 102A is fixed to a bleed port defined by compressor section 30 (shown in FIG. 1). Flapper assembly 104 is assembled externally by sliding pivot pin 118 through both pillow block 120, flapper 116, and spring 122. Flapper assembly 104 is then lowered into its seat in the outlet end of housing 102B, and pillow blocks 120 are then fastened to outlet end 102B to securely fix flapper assembly 104 therein. Outlet end 102B is then coupled to inlet end 102A by extending flapper 116 along flow path F, aligning inlet end 102A to outlet end 102B, and inserting flapper 116 into inlet end 102A as outlet end 102B is seated against inlet end 102A.

Figure 3:
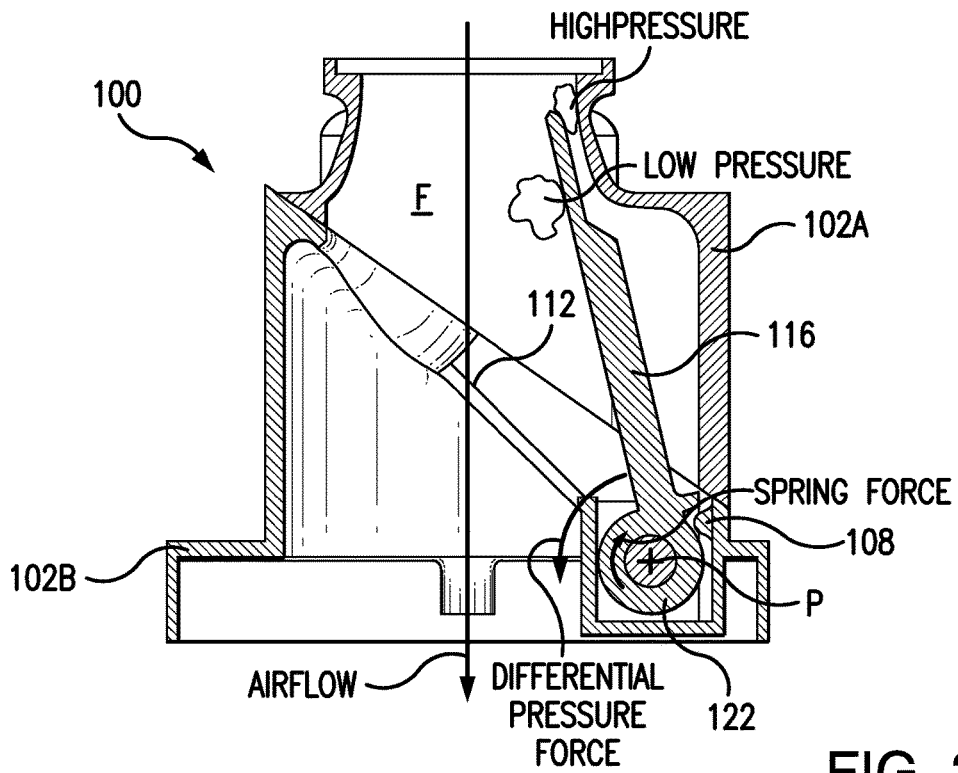
FIG. 3 is side elevation view of the bleed valve of FIG. 1, showing the flapper in the flapper open position.

Referring now to FIG. 3, bleed valve 100 is shown in the open position. Flapper 116 is pivotally connected to valve body outlet end 102B at pivot axis P and is movable relative to flapper seat 112. In the open position shown in FIG. 3, flapper 116 is oriented towards inlet end 102A such that fluid may traverse bleed valve 100 between inlet end 102A and outlet end 102B.

Biasing member 122 has a preload that exerts a spring force on flapper 116. The spring force urges flapper 116 to pivot about the pivot axis towards stop 108 with sufficient magnitude such that below a predetermined pressure differential between inlet and outlet ends of bleed valve 100 flapper 116 remains in the open position.

Stop 108 projects into flow path F such that a portion flapper 116 projects beyond stop 108 and extends obliquely into flow path F in the open position. The projection causes fluid traversing bleed valve 100 to form a region of high pressure and a region of low pressure on opposite sides of flapper 116. The pressure differential across flapper 116 exerts a force on flapper 116 in a direction opposite that exerted by biasing member 122. As will be appreciated, magnitude of the force exerted on the flapper from the pressure differential corresponds to the pressure differential across bleed valve 100. As will also be appreciated, above the predetermined pressure differential, the force associated with the pressure differential exceeds the biasing member force, and flapper 116 displaces from stop 108 and pivots towards flapper seat 112.

Figure 4:
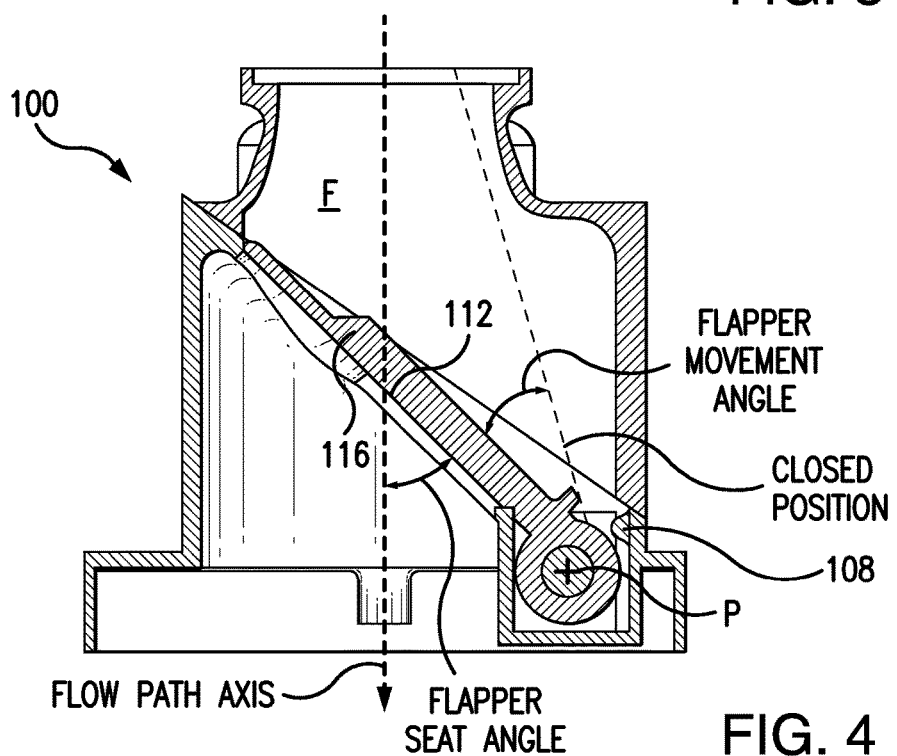
FIG. 4 is side elevation view of the bleed valve of FIG. 1, showing the flapper in the closed position.
Figure 5:
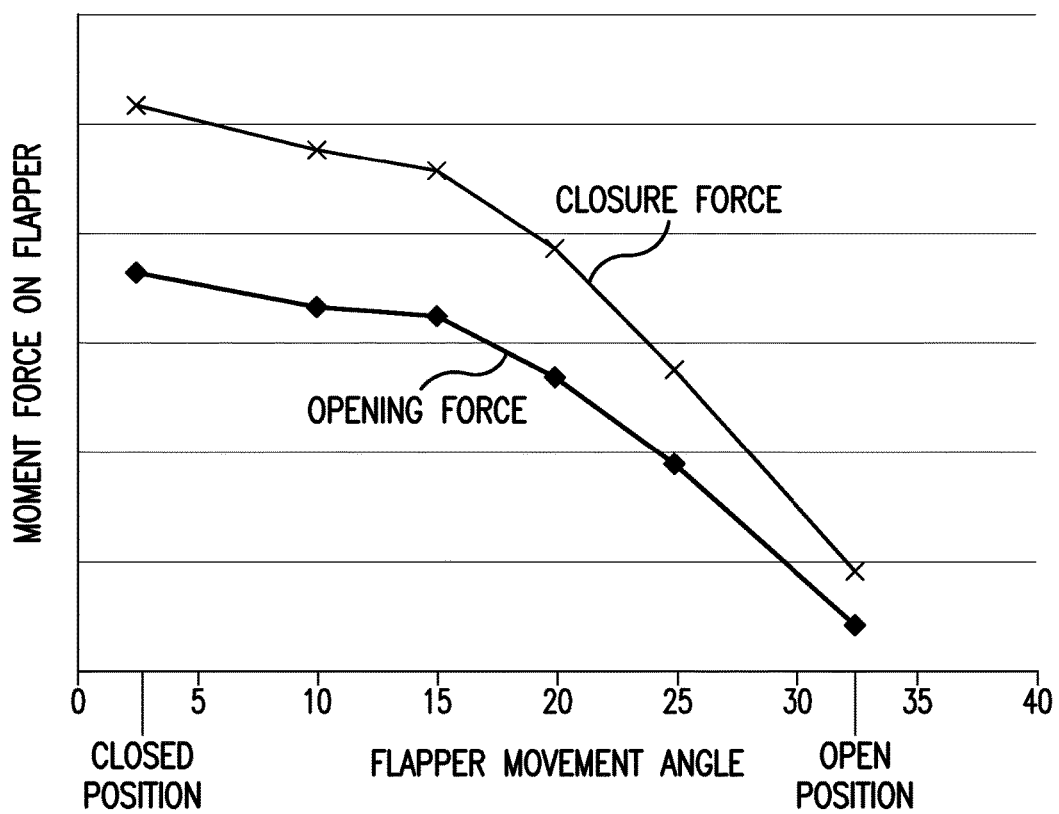
FIG. 5 is a chart showing the moment force of the flapper as a function of flapper position, showing force exerted on the flapper from fluid traversing the bleed valve when the flapper is in the open position.

With reference to FIG. 4, bleed valve 100 is shown with flapper 116 in the closed position. Flapper seat 112 is angled relative to a flow path axis defined by bleed valve 100. The flapper seat angle is oblique relative to the flow path axis, and may within a range of between about 40 degrees to about 50 degrees relative to the flow axis. The angled sealing arrangement provided by the flapper seat angle allows the flapper area, and thus the flapper sealing area, to be geometrically larger than that provided by shallower angles, thereby increasing the effect area of the valve. The angled sealing arrangement also reduces the angular displacement of flapper between open and closed positions. In the illustrated exemplary embodiment flapper seat 112 has a flapper seat angle that is about 45 degrees relative to the flow path axis defined by bleed valve 100.

A flapper movement angle is defined between flapper seat 112 and the flapper closed position (illustrated with a dashed line). The flapper movement angle is an acute angle and may be between about 27.5 degrees and 37.5 degrees. This allows bleed valve 100 to occupy a relative small footprint. It also causes the force exerted on flapper 116 by the pressure differential across flapper 116 to change throughout the flapper movement angle between the flapper open and closed positions, both during opening and closure (shown in FIG. 5). The closure force line describes a flapper at a constant differential pressure. As the valve strokes closed the dynamic force due to the motion of air flowing through the valve increases, causing the valve to snap closed. Notably, the dynamic force never exceeds the static force in the closed position, i.e. the static pressure force of the pressure differential on the sealing area. This is important as, when the differential pressure drops below the opening pressure, the valve will start to stroke open. If the dynamic forces were higher than the static forces (which are the sizing point of the spring), then the flapper would immediate close again, fluttering against the stop surface. In contrast, because the dynamic forces never exceed the static forces, no fluttering occurs in embodiments described herein. In the illustrated exemplary embodiment the movement angle of flapper 116 is about 32.5 degrees.

Conventional bleed valves can have a relatively large spatial envelope relative to the valve effective flow area due to the flow path defined by poppets and similar movement elements. Such bleed valves are also relatively long due to the in-line arrangement of components associated with the poppet, and are therefore typically bulkhead mounted or duct mounted using turning ducts. While satisfactory for their intended purpose, such valves can present packaging challenges in certain applications, such as gas turbine engines, wherein streamlining can be desirable.

In embodiments described herein, bleed valves include a valve body defining an internal flow path and a flapper pivotally mounted to the valve body relative to the flow path. The pivotal mounting of the flapper can reduce the radial height of the bleed valve, allowing the bleed valve to connect directly between fluid paths with relatively little restriction to the flow path and without requiring additional turning ducts. In certain embodiments, the bleed valve includes a split valve body including inlet and outlet ends, simplifying installation and maintenance of the bleed valve assembly. It is also contemplated that the bleed valve can include a pivot pin defining a pivot axis and a biasing member disposed about the pivot pin, thereby providing self-actuation—such as by applying a biasing force that urges the flapper toward the open position. When a predetermined pressure differential develops between the valve body inlet and outlet, the pressure force across the flapper overcomes the biasing force exerted on the flapper by the biasing member. This causes the flapper to displace from the open position, and bleed valve begins to close.

In accordance with certain embodiments, the angular movement range of the flapper relative to the flow path is in a portion of moment force function curve where the static and dynamic moment forces exerted on the flapper change more linearly as function of angular position. Force associated with the pressure differential increases quickly because, as the flapper closes, more area is presented to the flow path, increase the dynamic pressure area, making the valve snap shut. This reduces the tendency of the flapper to flutter, as can be the case in portions of the moment force function curve where the forces are relatively constant.

It is also contemplated that flapper be oriented nearly vertically, i.e. nearly parallel with the flow path, in the open position. This provides a relatively high discharge coefficient for the volume occupied by the bleed valve by using the velocity of air flowing over the flapper to generate a moment force on the flapper while in the open position, having a sealing surface that is oriented at about 45-degrees relative to the flow path. In embodiments, the pivot axis is in-line with the flapper seat plane resulting in a relatively linear moment force exerted on the flapper and preventing the dynamic moment from exceeding the static moment at a given pressure—eliminating flutter against the sealing surface during bleed valve opening and/or closure.

The methods and systems of the present disclosure, as described above and shown in the drawings, provide for bleed valves with superior properties including compact packaging and/or reduced flapper flutter during bleed valve opening and/or closure. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A bleed valve, comprising:
a valve body having an inlet end, an outlet end, and a flapper seat arranged along an axis between the inlet end and the outlet end, the valve body defining a flow path extending through the flapper seat;
a flapper having a pivot end and a free end, the flapper being pivotally connected to the valve body at the flapper pivot end and movable relative to the flapper seat between open and closed positions; and
a spring coupled between the flapper and the valve body biasing the flapper toward the open position, wherein the flapper seats against the flapper seat and blocks the flow path in the closed position,
wherein the flapper is angled toward an inlet of the valve body in the open position such that only a pressure differential across the flapper urges the flapper towards the closed position, and
wherein the free end of the flapper is positioned such that an angle between the flapper and the axis is less than 90 degrees in both the open and closed positions, and
wherein a pivot axis of the flapper is co-planar with the flapper seat, and a movement angle of the flapper between the open position and the closed position is within a range between about 27.5 degrees and about 37.5 degrees to limit valve flutter during valve opening and/or closure.

2. The bleed valve as recited in claim 1, wherein the flapper seat extends about the flow path such that flapper completely occludes the flow path in the closed position.

3. The bleed valve as recited in claim 1, wherein the flapper seat defines a seating surface that is oblique relative to the flow path.

4. The bleed valve as recited in claim 1, wherein the flapper has a pressure surface that presents an area that is greater than an effective flow area of the flow path in the closed position.

5. The bleed valve as recited in claim 1, further including a pivot pin offset laterally from the flow path and coupling the flapper to the valve body.

6. The bleed valve as recited in claim 5, further including pillow blocks disposed outside of the flow path and fixing the pivot pin relative to the valve body.

7. The bleed valve as recited in claim 4, wherein a portion of the pressure surface extends into the flow path when the flapper is in the open position.

8. The bleed valve as recited in claim 7, wherein the valve body defines a stop that is offset from a pivot axis of the flapper relative to the flow path defined by the valve body.

9. A gas turbine engine, comprising:
a compressor section with a main gas path; and
a bleed valve as recited in claim 1 connected to the compressor section and in selective fluid communication with the main gas path,
wherein the inlet end of the flapper valve is connected directly to the main gas path without a turning duct.

10. The gas turbine engine as recited in claim 9, wherein the flapper includes a single flapper element that completely occludes the flow path in the closed position.

11. The gas turbine engine as recited in claim 9, wherein the flapper seat defines a seating surface with an angle of between about 40 degrees and about 50 degrees relative to the axis.

* * * * *